(12) United States Patent
Munoz de la Torre Alonso et al.

(10) Patent No.: US 9,137,843 B2
(45) Date of Patent: Sep. 15, 2015

(54) METHOD AND NODE FOR CONTROLLING BEARER RELATED RESOURCES AS WELL AS A CORRESPONDING SYSTEM AND COMPUTER PROGRAM

(75) Inventors: Miguel Angel Munoz de la Torre Alonso, Madrid (ES); Pablo Molinero Fernandez, Madrid (ES)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 620 days.

(21) Appl. No.: 13/146,405

(22) PCT Filed: Jul. 1, 2011

(86) PCT No.: PCT/EP2011/061120
§ 371 (c)(1),
(2), (4) Date: Jul. 27, 2011

(87) PCT Pub. No.: WO2013/004271
PCT Pub. Date: Jan. 10, 2013

(65) Prior Publication Data
US 2013/0003566 A1     Jan. 3, 2013

(51) Int. Cl.
H04W 76/04    (2009.01)
H04W 76/02    (2009.01)

(52) U.S. Cl.
CPC .......... *H04W 76/041* (2013.01); *H04W 76/025* (2013.01)

(58) Field of Classification Search
CPC .......................... H04W 76/041; H04W 76/025
See application file for complete search history.

(56) References Cited

U.S. PATENT DOCUMENTS

2007/0259673 A1* 11/2007 Willars et al. ................. 455/453

FOREIGN PATENT DOCUMENTS

| EP | 1377092 A1 | 1/2004 | |
| WO | WO 2011/057672 | * 5/2011 | H04W 28/16 |

OTHER PUBLICATIONS

3GPP TS 23.203 v11.2.0 (Jun. 2011).*
3GPP TS 23.203 v11.2.0, Jun. 2011, 3GPP.*
3rd Generation Partnership Project, "3rd Generation Partnership Project; Technical Specification Group Services and System Aspects; Study on Policy solutions and enhancements (Release 11)", 3GPP TR 23.813 V11.0.0, Jun. 1, 2011, pp. 1-42, 3GPP.

(Continued)

*Primary Examiner* — Jae Y Lee
(74) *Attorney, Agent, or Firm* — Coats & Bennett, PLLC

(57) ABSTRACT

The present invention relates to a method for controlling bearer related resources by a policy and charging system in a communication network and a node for controlling bearer related resources, as well as to a system comprising the node, and to a computer program configured to make effective use of bearer resources of a telecommunication network. The method for controlling bearer related resources by a policy and charging system in a communication network comprises the steps of obtaining, at a network node, bearer support information indicating whether a user equipment, UE, supports a dedicated bearer of a plurality of bearers, which is a bearer dedicated to a service session; setting a time period for the service session according to the obtained bearer support information; and instructing a modification of a reserved bearer resource assigned to the service session when the set time period expires.

17 Claims, 7 Drawing Sheets

(56) References Cited

OTHER PUBLICATIONS

3rd Generation Partnership Project, "3rd Generation Partnership Project; Technical Specification Group Services and System Aspects; Policy and charging control architecture (Release 12)", Technical Specification, 3GPP TS 23.203 V12.3.0, Dec. 1, 2013, pp. 1-215, 3GPP, France.

3rd Generation Partnership Project, "3rd Generation Partnership Project; Technical Specification Group Core Network and Terminals; Policy and Charging Control (PCC); Reference points (Release 12)", Technical Specification, 3GPP TS 29.212 V12.3.0, Dec. 1, 2013, p. 1-217, 3GPP, France.

3rd Generation Partnership Project, "3rd Generation Partnership Project; Technical Specification Group Core Network and Terminals; Policy and Charging Control over Rx reference point (Release 12)", Technical Specification, 3GPP TS 29.214 V12.2.0, Dec. 0, 2013, pp. 1-58, 3GPP, France.

Ericsson, "SASN 2009A Technical Product Description Overview", Jun. 18, 2010, pp. 1-36, 221 02-AXB 250 60/4 Uen Rev L, Ericsson AB.

Ericsson et al., "Exclusive strategic alliance to create mobile cloud acceleration solutions", Ericsson Akamai presentation, Mar. 22, 2011, pp. 1-12, Ericsson.

* cited by examiner

METHOD AND NODE FOR CONTROLLING BEARER RELATED RESOURCES AS WELL AS A CORRESPONDING SYSTEM AND COMPUTER PROGRAM

TECHNICAL FIELD

The present invention relates to a method for controlling bearer related resources by a policy and charging system in a communication network and a node for controlling bearer related resources, as well as to a system comprising the node, and to a computer program configured to make effective use of bearer resources of a telecommunication network.

BACKGROUND

In communication networks, such as telecommunication networks, a call or a service often involves, on the one hand, a control plane or signalling plane and, on the other hand, a user plane or a media plane. The control plane or signalling plane is in charge of establishing and managing a connection between two points of the network. The user plane or media plane is in charge of transporting user data or service data. Network operators have the desire to define and enforce a set of rules in the network. A set of rules constitutes policies. A policy framework for managing and enforcing these policies usually includes at least three elements or functions: a policy repository for storing policy rules, which may be user specific, a policy decision element or function and a policy enforcement element or function. The purpose of a policy framework includes controlling subscriber access to networks and services as well as the kind of access, i.e. its characteristics.

A policy framework notably addresses the decision as to whether the subscriber is entitled, or authorized, to enjoy a service, and whether the network can provide the service to the subscriber, and particularly whether the network can provide the service to the subscriber with a desired Quality of Service (QoS).

Policy and charging control architectures, such as, but not limited to, the architecture described in 3GPP TS 23.203 version 11.1.0 (2011-03), Technical Specification Group Services and System Aspects; Policy and charging control architecture (release 11) (available on http://www.3gpp.org/ftp/Specs/2011-03/Rel-11/23_series/), integrate policy and charging control. The Policy and Charging Control (PCC) architecture permits to integrate both policy and charging control. One aim of a policy framework is to set up and enforce rules dependent on subscribers and/or desired services to ensure efficient usage of network resources among all subscribers.

An architecture that supports Policy and Charging Control (PCC) functionality is depicted in FIG. 1 which is taken from 3GPP TS 23.203 specifying the PCC functionality for Evolved 3GPP Packet Switched domain including both 3GPP accesses (GERAN/UTRAN/D-UTRAN) and Non-3GPP accesses. The Policy Control and Charging Rules Function (PCRF) 110 is a functional element that encompasses policy control decision and flow based charging control functionalities. The PCRF provides network control regarding Service Data Flow (SDF) detection, gating, QoS and flow based charging (except credit management) towards the Policy and Charging Enforcement Function (PCEF) 120. The PCRF receives session and media related information from the Application Function (AF) 140 and informs the AF of traffic plane events. The PCRF 110 is also coupled to a Subscriber Profile Repository (SPR) 150.

The PCRF provides PCC Rules to the PCEF via the Gx reference point and may provide QoS Rules to the Bearer Binding and Event Reporting Function (BBERF) 130 via the S7x reference point.

The Gx reference point or interface is defined in 3GPP TS 29.212 "Policy and charging control over Gx reference point", and lies between the PCRF and the PCEF. The reference point is used for provisioning and removal of PCC rules from the PCRF to the PCEF and the transmission of traffic plane events from the PCEF to the PCRF. The Gx reference point can be used for charging control, policy control or both.

The Rx reference point is defined in 3GPP TS 29.214 "Policy and charging control over Rx reference point" and is used to exchange application level session information between the PCRF and the AF. An example of PCRF is the Ericsson Service-Aware Policy Controller (SAPC), see for example F. Castro et al., "SAPC: Ericsson's Convergent Policy Controller", Ericsson review No. 1, 2010, pp. 4-9. An example of an AF is the IP Multi-Media Subsystem (IMS) Proxy Call Session Control Function (P-CSCF).

Both Gx and Rx reference points may be based on Diameter, see for example P. Calhoun et al., "RFC 3588: Diameter Based Protocol", IETF, September 2003.

In the architecture 100 of FIG. 1, the PCRF informs the PCEF through the use of PCC rules, for example, how to control the radio resources of the telecommunications network. For example, IP packets constituting traffic in the network are assigned to bearer resources.

The node including the PCEF or another Bearer Binding Function (BBF) encompasses SDF detection based on filter definitions included in PCC rules, as well as online and offline charging interactions and policy enforcement. Since the PCEF is usually the one handling bearers, it is where the QoS is being enforced for the bearer according to the QoS information coming from the PCRF. For example, the PCEF is located at a gateway, such as the Gateway GPRS Support Node (GGSN), in the GPRS case. For all the cases where there is Proxy Mobile IP (PMIP) or Dual-Stack Mobile IP (DSMIP) in the core network, the bearer control is performed in the BBERF instead.

The Application Function (AF) 140 is an element offering applications in which service is delivered in a different layer, e.g. transport layer, from the one the service has been requested, e.g. signalling layer. The control of resources, such as, but not limited to, IP bearer resources, is performed according to what has been negotiated. One example of a network node including an AF 140 is the P-CSCF of the IP Multi-Media (IM) Core Network (CN) subsystem. The AF 140 may communicate with the PCRF 110 to transfer dynamic session information, i.e. description of multi-media to be delivered in the transport layer. This communication is performed using the above-described Rx interface or Rx reference point, which is placed between the PCRF 110 and the AF 140 and is used to exchange application level information between the PCRF 110 and the AF 140. Information in the Rx interface may be derived from the session information in the P-CSCF and it mainly includes what is called media components. A media component is composed by a set of IP flows, each one described through a 5-tuple, the media type and bandwidth required, for example. Another example of a network node including an AF 140 is a streaming server.

The PCRF 110 may also contact the SPR 150 to obtain subscription data. The SPR may contain information about the subscriber and its policies. If a user is a "premium" subscriber and is permanently able to have bandwidths larger than the average user and/or sessions of this user are connected with high QoS.

Upon reception of the PCC/QoS rule from the PCRF, the PCEF or the BBERF perform bearer binding, i.e. associate the provided rule to an IP-CAN bearer within an IP-CAN (Internet Protocol Connectivity Access Network) session. The bearer binding function will use the QoS parameters provided by the PCRF to create the bearer binding for the rule. The binding is created between service data flows included in the PCC/QoS rule and the IP-CAN bearer which have the same QoS Class Identifier (QCI) and Allocation Retention Priority (ARP).

Generally, the bearer binding function will evaluate whether it is possible to use one of the existing IP-CAN bearers or not. If none of the existing bearers can be used, the establishment of a suitable IP-CAN bearer is initiated. Otherwise, if required, e.g. QoS information has changed, the BBF will initiate the modification of a corresponding bearer. For GBR bearers, i.e. bearers with a guaranteed bit rate, the BBF will reserve the required resources based on the QoS information provided by the PCRF.

Next, PCC support to applications is described. When an application requires dynamic policy and/or charging control over the IP-CAN user plane to start a service session, the AF communicates with the PCRF to transfer the dynamic session information required for the PCRF to take the appropriate actions on the IP-CAN network. The PCRF authorizes the session information, creates the corresponding PCC/QoS rules and installs them in the PCEF/BBERF. The applicable bearer will be initiated/modified and if required, resources will be reserved for that application.

Once the application or the user equipment (UE) decides to terminate that service, the AF communicates the PCRF so that the PCRF can remove the applicable PCC/QoS rules and the PCEF/BBERF stops the corresponding SDF detection, policy enforcement and flow based charging functionalities, terminating or updating the applicable bearer, and releasing the corresponding resources.

An application server including the AF, such as a streaming server, may request establishment of a bearer from the PCRF according to its requirements, i.e. video or other streaming services requiring specific bandwidths, QoS, charging, etc.

Deep Packet inspection (DPI) technology supports packet inspection and service classification, which consists of IP-packets classified according to a configured tree of rules so that they are assigned to a particular service session. DPI is currently under standardization, as the so-called Traffic Detection Function (TDF), which can be either standalone or collocated with the PCEF, wherein traffic is captured by this function for packet inspection. The data traffic captured by the TDF is usually IP-packet data. For details, it is referred to 3GPP TR 23.813.

Currently, most existing UEs do not have support for dedicated bearers. Therefore, all traffic, i.e. all data traffic of the services the user is running, goes into the default bearer and it is not possible to assign different QoS for each service the user is running. This problem applies both to the standalone TDF and to the TDF collocated with a PCEF.

For example, in case of a sponsored service, the default bearer QoS is upgraded, e.g. by means of changing QCI or ARP, which have been described above, which means that other non-sponsored services on the same default bearer also experience the upgraded QoS. Therefore, the non-sponsored services will get a "free ride", i.e. the same upgraded QoS without any sponsoring. When the sponsored service stops, the default bearer QoS goes back to the previous (non-boosted) QoS.

Some services/protocols like RTSP (Real Time Streaming Protocol) indicate a service stop condition in their own signalling (RTSP.TEARDOWN), but the majority of services, e.g. I-ITTP browsing, do not have such an indication, so a service stop condition needs to be based on inactivity timers handled locally by the TDF. This is an internal TDF functionality not defined in 3GPP and the external effect is that the event (service stop) is used to trigger the modification of the bearer resources, such as bearer QoS. Inactivity timers are usually set to very high values, so that the upgraded QoS remains for a very long time, even if the user is not running the sponsored service anymore. Accordingly, other non-sponsored services are taking a "free ride" during that period of time until the sponsored service session times out.

The same applies in the opposite scenario, for services which need to be downgraded in QoS. For example, the operator does not allow mobile IP telephony, such as Skype, on the UE and would like to downgrade the QoS of the service. If the user stops the mobile IP telephony session, the inactivity timer for that service session would still be running, so that the QoS remains downgraded for all services and the other services, which are not to be downgraded, also still experience a lower QoS, while this is not desired.

Since resources are limited in the network an optimized use of them is a requirement for the network operator, resources, and in particular bearer resources, have to be controlled efficiently. Therefore, there is a desire to provide efficient, flexible and/or fair resource allocation to services.

SUMMARY

A method, node, system and computer program are defined in the independent claims. Advantageous embodiments are defined in the dependent claims.

In one embodiment, a method for controlling bearer related resources by a policy and charging system in a communication network is provided. The method comprises the steps of obtaining, at a network node, bearer support information indicating whether a user equipment (UE) supports a dedicated bearer of a plurality of bearers, which is a bearer dedicated to a service session, and setting a time period for the service session according to the obtained bearer support information. The method further comprises the step of instructing a modification of a reserved bearer resource assigned to the service session when the set time period expires. Accordingly, bearer resources can be controlled depending on the type of UE, i.e. whether the UE supports a dedicated bearer or several dedicated bearers in addition to at least one default bearer or not, and bearer resources, such as QoS, can be adapted depending on the service carried by one of the bearers. Therefore, bearer support information can be used to set a time period accordingly and efficient and flexible control of bearer related resources is possible.

In one embodiment, a node of a policy and charging system is provided for controlling bearer related resources in a communication network, The node comprises an obtainer configured to obtain bearer support information indicating whether a user equipment (UE) supports a dedicated bearer of a plurality of bearers, which is a bearer dedicated to a service session, and a timer configured to set a time period for the service session according to the obtained bearer support information. The node further comprises a controller configured to instruct a modification of a reserved bearer resource assigned to the service session when the time period expires. Accordingly, bearer resources can be controlled depending on the type of UE, and bearer resources, such as QoS, can be adapted depending on the service carried by one of the bearers.

In another embodiment, a system for controlling bearer related resources comprises the above-described node and another node including a Policy and Charging Rules Function (PCRF) configured to determine whether a dedicated bearer is supported based on an identifier of the UE or network bearer support information and UE bearer support information and to include the result of the determination in the bearer support information. Accordingly, bearer resources can be controlled depending on the type of UE, and bearer resources, such as QoS, can be adapted depending on the service carried by one of the bearers.

In another embodiment, a computer program is provided which includes instructions configured, when executed on a data processor, to cause the data processor to execute the above-described method.

Further, advantageous embodiments of the invention are disclosed in the dependent claims.

DESCRIPTION OF THE EMBODIMENTS

The further embodiments of the invention are described with reference to the figures. It is noted that the following description contains examples only and should not be construed as limiting the invention.

In the following, similar or same reference signs indicate similar or same elements or operations.

Figure 1:
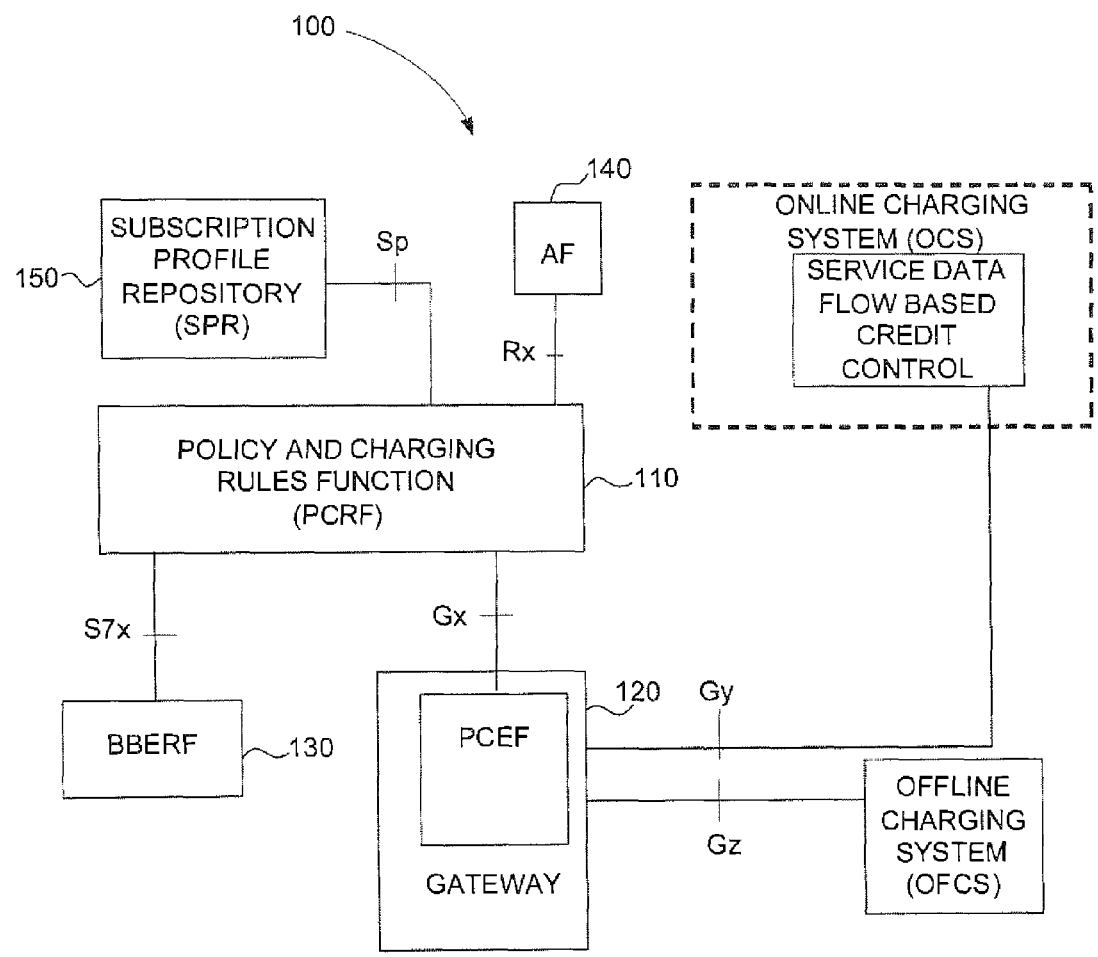
FIG. 1 illustrates an exemplary PCC architecture to assist the reader in understanding an exemplary context, in which embodiments of the invention may be applied.
Figure 2:
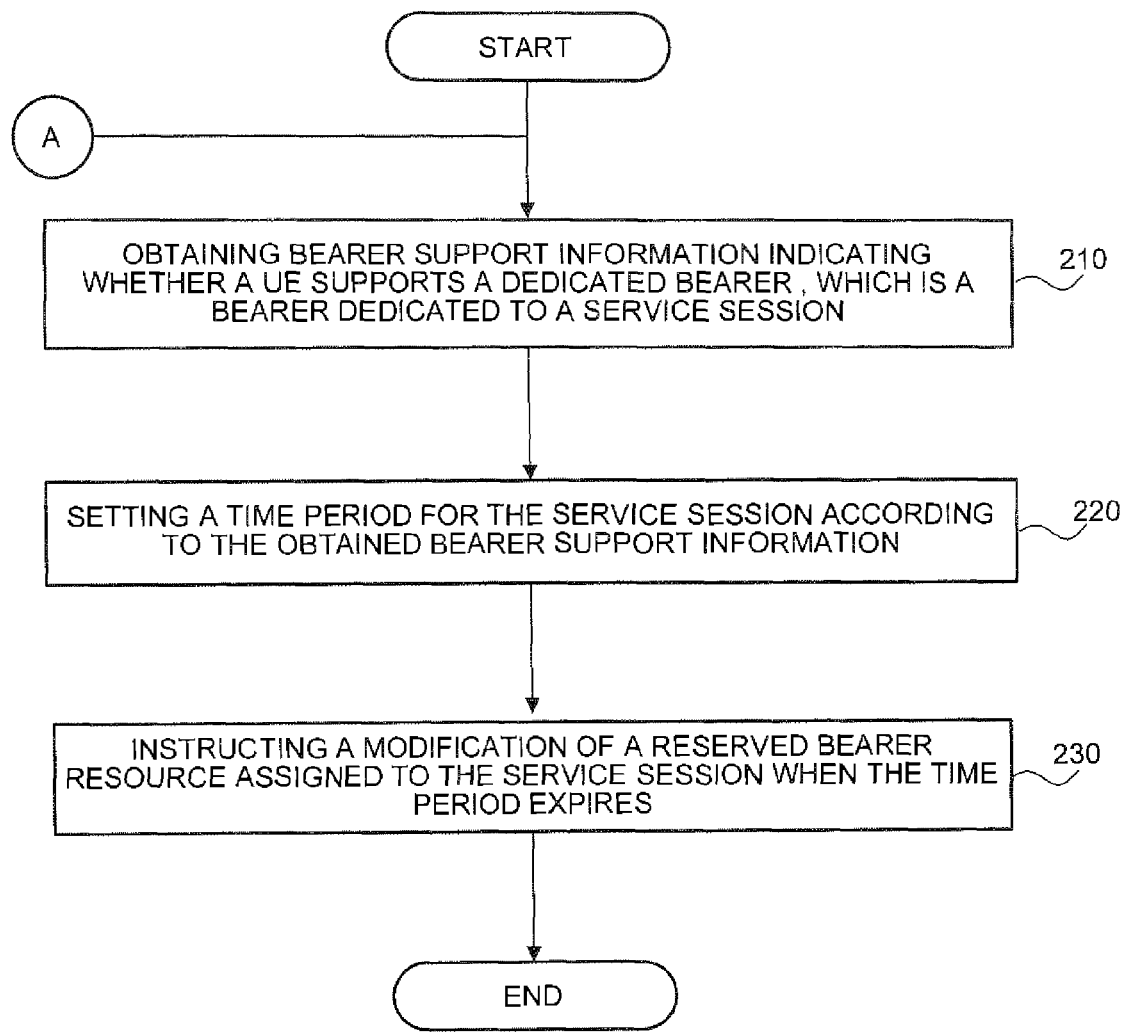
FIG. 2 illustrates operations of a method for controlling bearer related resources according to an embodiment.

FIG. 2 illustrates a flow chart of a method for controlling bearer related resources. The steps of the method may be carried out by one or more nodes of a policy and charging system, preferably including a Traffic Detection Function (TDF) collocated with a PCEF or a standalone TDF. For assisting the reader in understanding embodiments of the invention, examples are described by referring to the PCC architecture of FIG. 1. As described above, the functions described in FIG. 1 are functional elements which may be placed in nodes of the policy and charging system and may be realized by suitable servers, routers, computers, a combination thereof, etc. as known in the art.

As can be seen in FIG. 2, the method comprises a step 210 in which bearer support information is obtained at a network node, for example the network node including the PCEF 120 or TDF collocated with the PCF or standalone.

Bearer support information indicates whether a user equipment (UE) supports a dedicated bearer, which is a bearer dedicated to a specific service session. Bearer support information may be provided by a message containing a field having a certain bit pattern or simply a single bit indicating that the UE in communication with the policy and charging system supports a dedicated bearer. UEs that support dedicated bearers are usually novel terminals designed for LTE (Long Term Evolution) mobile communications or 3GPP Release 7 (particular terminals implementing "Network Requested Secondary PDP Context Activation" specified in 3GPP 23.060 and 24.008 from 3GPP Release 7). Such a terminal usually supports a plurality of bearers including at least one dedicated bearer and one default bearer. Examples of messages carrying bearer support information are messages carrying a Bearer-Control-Mode AVP (Attribute Value Pair) or UE-Dedicated-Bearer-Support AVP, herein called bearer control mode message and dedicated bearer support message, respectively, which will be described in detail further below. The skilled person realizes that instead of Bearer-Control-Mode AVP or UE-Dedicated-Bearer-Support AVP also other AVPs, e.g. AVPs derived from the above mentioned AVPs can be used also. For example, vendors may modify the AVPs or simply change the AVP names or combine two AVPs into one.

In step 220, a time period for the service session according to the obtained bearer support information is set. The time period may be set in the TDF node or PCEF node 120, however, it is also feasible that the time period is set by the PCRF node 110. The TDF node may either be a standalone TDF or a TDF collocated with the PCEF 120 which will be described in more detail below with respect to FIGS. 8A and 8B.

Depending on whether the UE supports a dedicated bearer or not there are two modes of operation, for example.

In the first mode, the time period is set to a short time period if the bearer support information indicates that the UE does not support a dedicated bearer for the service session. Accordingly, the service session should have an aggressive time out period, e.g. between 30 seconds and 2 minutes, to avoid free rides from other services.

In another mode, the time period is set to a long time period if the bearer support information indicates that the UE supports a dedicated bearer for the service session. Accordingly, the service session should have a very long time out period, e.g. on the order of tens of hundreds of minutes.

In step 230, a modification of a reserved bearer resource assigned to the service session is instructed, when the set time period, i.e. the short time period or the long time period described above, expires. For example, the TDF may send a signal instructing the PCEF including the BBF to modify the bearer QoS. This is particularly useful if the node including the TDF which performs packet inspection and service classification is a standalone node so that a message is needed to be communicated between the PCEF and the TDF.

The same scheme can be used when several dedicated bearers are used for one single service, e.g. video call, where there may be one dedicated bearer to carry video packets and another dedicated bearer to carry voice packets. Accordingly, the modification of the bearer resource after a short time period then comprises the modification of two bearers.

It should be understood that the method may also be carried out by a different node other than the TDF node or the node combining the TDF and PCEF, or be distributed over different nodes of the system, wherein the BBF is then instructed to modify the bearer resource.

A possible operation may include the TDF monitoring IP packets classified according to a specific rule and assigned to a particular service session, such as a sponsored service, and thus setting a time period to a long time period and starting this time period once no IP packets of the sponsored service are detected anymore. Thus, the time period may be regarded as the time period between the last detected IP packet and the sending of a stop message from the TDF to the PCRF. In other words, the stop message from the TDF to the PCRF is delayed by this time period so that the Rx interface and Gx interface are not right away influenced but a modification is carried out with some delay.

In the case of a dedicated bearer on which only a sponsored service is carried, the dedicated bearer and its QoS may be maintained for the above described long time period and no other service gets a free ride. In the case of a default bearer on which a sponsored service and another service are carried, the default bearer and its higher QoS may be maintained for the short time period before going back to a lower (original) QoS, which is provided for normal services.

Similarly, instead of detecting whether no IP packets of the sponsored service are detected, triggering the time out period may be done once the traffic flow comprising the packet data falls below a certain threshold value. This may be advantageous if a service uses an "are you still there" signalling which provides little but detectable data traffic. For example, the timer runs for as long as the service data rate is below a certain threshold. If the service data rate goes above the threshold, the timer is reset and the timer does not start until the service data rate falls under the threshold value. Further, it is possible to provide a cumulative timer having a counter function, namely the timer may run x seconds until service data is detected again and instead of restarting at 0 seconds once service data is below a certain threshold at a later point in time, the timer may start at the later point in time at x seconds and run until the set time period is reached and resources are modified.

In contrast to the above, if the UE does not support dedicated bearers and all services are carried on the same default bearer, the time period is set to a shorter time period, for example, to avoid that other services experience a high QoS (if the QoS of the bearer is the bearer resource), when the sponsored service is not running anymore. Since the sponsored service is not running anymore, the QoS should be downgraded quickly because there is no reason why the other services on the same default bearer should further experience an upgraded QoS.

In the above example, the modification of the bearer resource was described as downgrading the QoS of a bearer, however other types of modification of a bearer resource are possible, such as disconnecting the bearer, providing a lower guaranteed bit rate to the bearer or switching to the best effort bit rate. Disconnecting the bearer, may be particularly advantageous when the bearer is a dedicated bearer running only one sponsored service so that the bearer may be disconnected when the service is not run anymore by the user. In this case, other established bearers between the UE and a different application server providing different services, may be maintained, such as default bearers.

In the following, different scenarios dependent on the structure and distribution of the functions in the policy and charging system are described. In one of the exemplary scenarios, the TDF is a standalone node and in the other scenario the TDF is collocated with the PCEF.

Figure 3A:
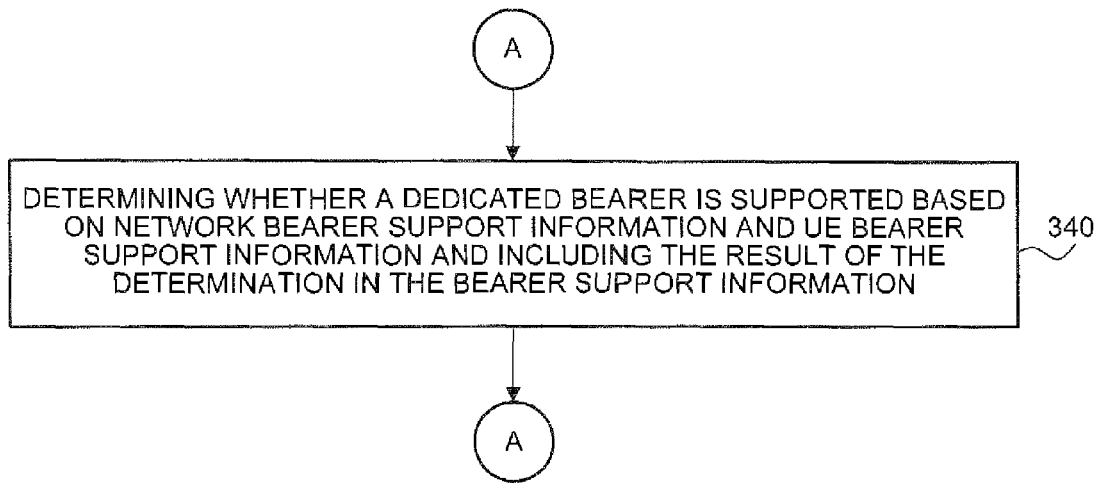
FIG. 3A illustrates operations of a method for controlling bearer related resources based on bearer control mode.
Figure 3B:
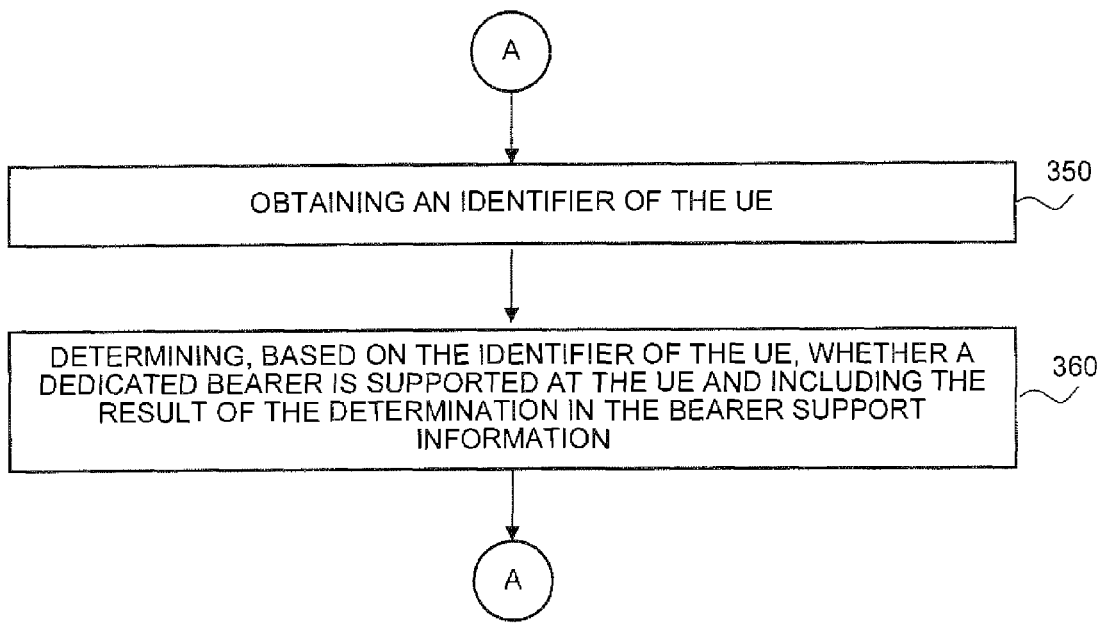
FIG. 3B illustrates operations of a method for controlling bearer related resources based on IMEI.

At first, the scenario with the standalone TDF node is described with respect to FIGS. 3A and 3B. In this scenario two mechanism may be distinguished which can be used to differentiate between terminals, e.g. UEs, supporting dedicated bearers and terminals not supporting dedicated bearers. The first mechanism is based on Bearer Control Mode (BCM) and described with respect to FIG. 3A and the second mechanism is based on the International Mobile Station Equipment Identity (IMEI) of the UE.

FIG. 3A illustrates a step 340, which precedes steps 210, 220 and 230 of FIG. 2. In step 340, it is determined at the network node including a policy and charging rules functions, such as PCRF 110, whether a dedicated bearer is supported based on network bearer support information and UE bearer support information and the result of the determination is included in the bearer support information, which is described above. Therefore, bearer support information may also be the combination of information regarding the UE support for dedicated bearers and also network support for dedicated bearers.

As will be described in more detail with respect to FIG. 5 below, the bearer support information from the network node including the PCRF is received at the other network node described above with respect to step 210, e.g. the node including the TDF, in a bearer control mode message. In detail, the node including the PCRF receives information that network initiated bearers are supported by the UE (UE bearer support information) and information that network initiated bearers are supported by the Serving GPRS Support Node (SGSN) (network bearer support information).

This BCM-based mechanism will now be described in detail with respect to FIG. 5.

In the following example, it is assumed that the PCEF is in the GPRS Gateway Support Node (GGSN) and the UE communicates over a base station system with a Serving GPRS Support Node (SGSN). As can be seen in FIG. 5, the flow diagram applies to the scenario having a standalone TDF, where the BCM information between PCRF and standalone TDF may be carried either by the Rx interface (RAR or AAA message) or Gx interface (RAR or CCA message). The meanings of the abbreviations of these messages are found at the end of the description.

Figure 5:
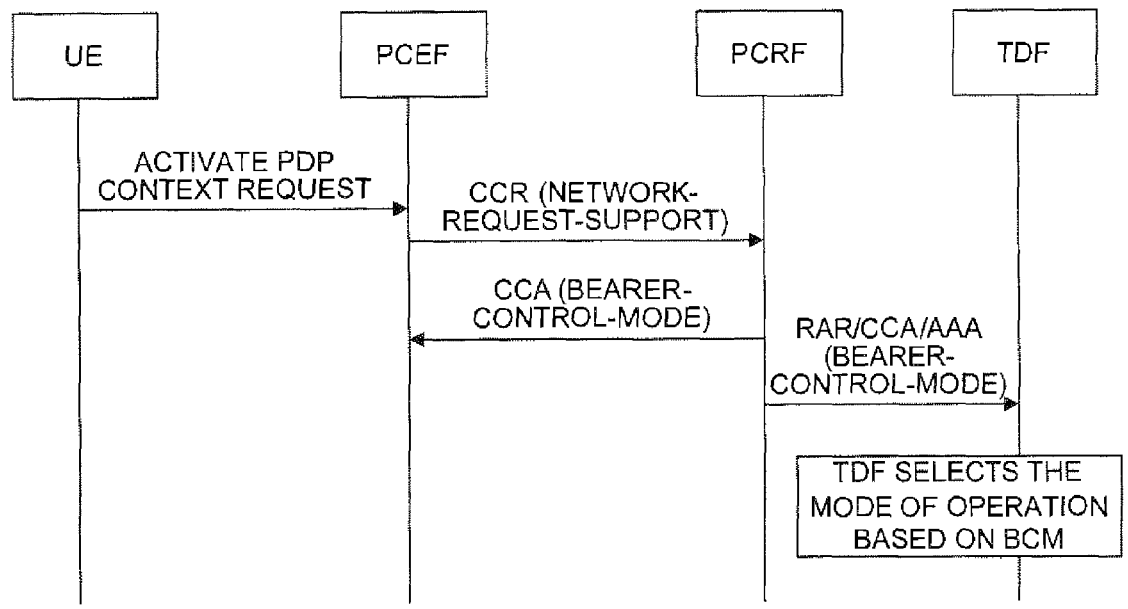
FIG. 5 illustrates an exemplary method according to an embodiment based on bearer control mode.

After the UE activates a PDP context request, at user session establishment, the PCEF node forwards Network-Request-Support AVP in Gx CCR initial to PCRF, see FIG. 5.

In more detail, when PCEF is in the GGSN node, as described above, if both the UE and the SGSN support network-initiated dedicated bearers, the GGSN indicates towards the PCRF that the network-initiated dedicated bearers are supported by including the Network-Request-Support AVP with the value NETWORK_REQUEST SUPPORTED (1). If any of the UE or SGSN does not support network-initiated bearers, the GGSN includes the Network-Request-Support AVP with the value NETWORK_REQUEST NOT SUPPORTED (0). Accordingly, depending on the values in the Network-Request-Support AVPs, which may be values in fields, called AVPs, of a message in a protocol, the PCRF is informed about the type of the UE, namely whether the UE supports dedicated bearers or not.

The PCRF derives the selected Bearer-Control-Mode AVP based on the received Network-Request-Support AVP, access network information, subscriber information and operator policy. The PCRF then sends the Bearer-Control-Mode AVP to the PCEF in a Gx CCA response message.

When the PCEF is the GGSN node, if the GGSN indicates NETWORK_REQUEST_SUPPORTED, the PCRF returns the Bearer-Control-Mode AVP with the value UE_NW (2). If the GGSN indicates NETWORK_REQUEST NOT SUPPORTED, the PCRF returns the Bearer-Control-Mode AVP with the value UE_ONLY (0). If the Bearer-Control-Mode is UE_ONLY, the network-initiated bearers are not supported and the PCRF installs all the PCC rules on the default bearer. This signalling is shown in FIG. 5 between the PCRF and the PCEF. As can be seen in FIG. 5, the PCRF also sends the Bearer-Control-Mode AVP to the standalone TDF, for example through the Sd reference point (see FIG. 8A) (in Gx RAR or CCA message).

If the standalone TDF receives the Bearer-Control-Mode AVP with UE_NW (2) value, this implies that the UE supports dedicated bearers. For standalone TDF, and in case the Gx interface between the standalone TDF and PCRF is not available, another alternative is to convey the Bearer-Control-Mode AVP using the Rx protocol and a Rx RAR or Rx AAA message.

Finally, once the TDF in FIG. 5 receives the Bearer-Control-Mode AVP, it selects the mode of operation based on the Bearer Control Mode (BCM), i.e. it instructs to set or sets itself a time period for the service session according to the obtained bearer support information received in the RAR/CCA/AAA message.

Using a different mechanism, the TDF may derive whether dedicated bearers are supported based on an identifier of the UE, such as the IMEI of the UE or the UE model and/or version. This will be described in detail with respect to FIG. 3B as well as specific examples with respect to FIGS. 6 and 7.

As can be seen in FIG. 3B, the steps 350 and 360 precede the steps 210-230 of the method described with respect to FIG. 2. In step 350, an identifier of the UE, such as the IMEI, is obtained. The identifier is not limited to an IMEI itself but may also be information related to an IMEI. For example, a query with an IMEI may be made at an IMEI database which sends back an identifier which indicates whether a UE supports a dedicated bearer or not. Therefore, such an identifier may also be regarded as bearer support information.

In step 360, it is determined, based on the identifier of the UE, whether a dedicated bearer is supported at the UE and the result of the determination is included in the bearer support information. For example, the determining step 360 is performed at session establishment at the PCRF. In some embodiments, as described in more detail with respect to FIG. 6, the PCRF may receive the identifier from the database IMEI DB, determine whether a dedicated bearer is supported, and prepare bearer support information to be sent to the TDF. In detail, the TDF receives the bearer support information from the PCRF in a bearer support message, as will be described with respect to FIG. 6, or from a database storing a plurality of identifiers directly, which will be described with respect to FIG. 7 below.

In the following, the IMEI based mechanism is described in more detail by referring to two specific examples shown in the flowcharts of FIGS. 6 and 7.

As mentioned above, to know if the UE supports dedicated bearers or not, the standalone TDF may derive this from the IMEI. For example, the standalone TDF receives the IMEI at user session establishment from RADIUS signalling in 3GPP-IMEISV (26/10415/20). This is shown in FIGS. 6 and 7 in the second step between PCEF and TDF after PDP Context Request has been activated. FIG. 6 describes a scenario for a standalone TDF, when both a PCRF and an external IMEI database are involved. FIG. 7 applies to a scenario for a standalone TDF, but in this case the TDF node directly queries the IMEI database (DB) and goes not through the PCRF node as in FIG. 6.

Further, three alternatives may be of interest.

In one alternative, local policies in a standalone TDF based on IMEI ranges, for example, are used.

In another alternative, the standalone TDF sends the obtained IMEI to the PCRF in a Gx CCR initial message in User-Equipment-Info AVP, which is already supported in 3GPP, but not in the Sd reference point. If the Gx interface between PCRF and standalone TDF is not available, User-Equipment-Info AVP may be carried from the PCEF to the PCRF as part of the standard procedure, as shown by the dashed arrow in FIG. 6.

PCRF will then check locally or through external databases if that IMEI supports dedicated bearers or not, and will indicate it to the standalone TDF in the Gx CCA response message in a UE-Dedicated-Bearer-Support AVP, which is for example, a proprietary AVP, not supported in 3GPP.

Figure 6:
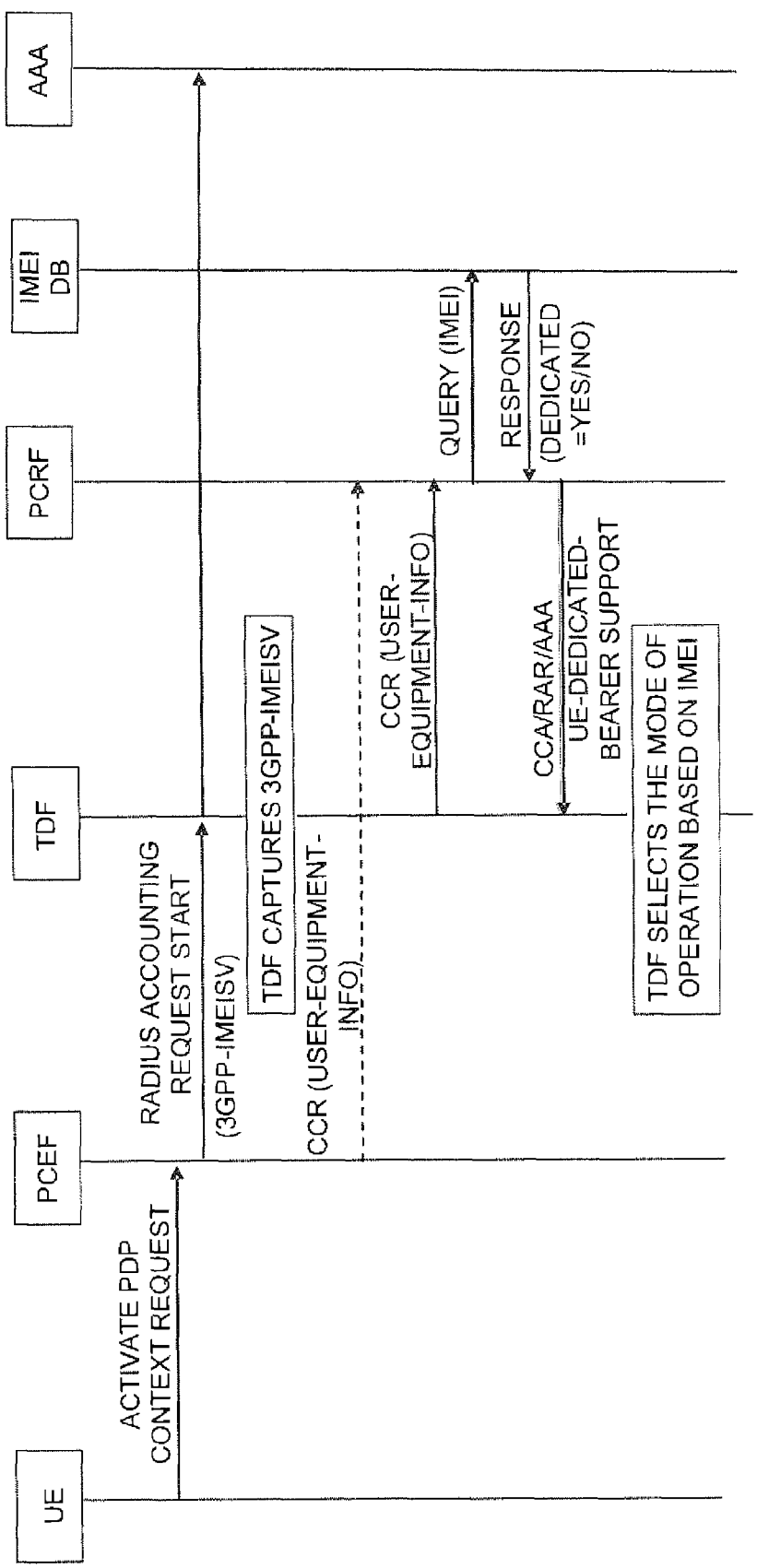
FIG. 6 illustrates an exemplary method according to an embodiment based on IMEI.

In another alternative, for a standalone TDF, and in case the Gx interface between standalone TDF and PCRF is not available, the UE-Dedicated-Bearer-Support AVP is conveyed in an Rx RAR or Rx AAA message (see FIG. 6). As described above, examples of messages carrying bearer support information are the previously described messages carrying a Bearer-Control-Mode AVP or the here described messages carrying the UE-Dedicated-Bearer-Support AVP (dedicated bearer support message). Note that the PCRF may already receive the IMEI in the User-Equipment-Info AVP from the PCEF through the Gx interface so that it might not be necessary that the standalone TDF passes it to the PCRF. As mentioned before, the PCRF may check locally or through external data base(s) if the IMEI supports dedicated bearers or not, and may indicate this to the TDF in a Rx RAR or Rx AAA response message in a UE-Dedicated-Bearer-Support AVP, which is a proprietary AVP, not supported in 3GPP.

Figure 8A:
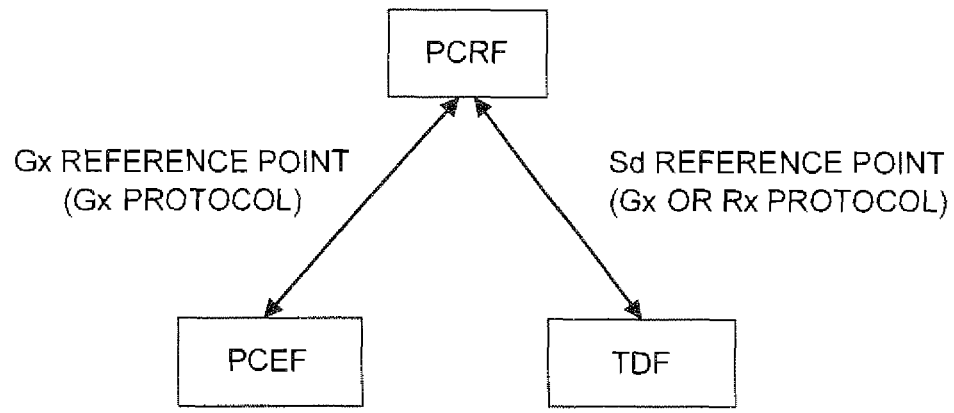
FIG. 8A illustrates a standalone TDF.

As discussed above, the UE-Dedicated-Bearer-Support AVP between the PCRF and standalone TDF may be carried either by the Rx interface (RAR or AAA message) or the Gx interface (RAR or CCA message), which is indicated in FIG. 6 by the arrow from the PCRF to the TDF, and wherein the different interfaces, i.e. reference points are shown in FIG. 8A.

Note that retrieving an IMEI from RADIUS signalling at a standalone TDF is not contemplated by 3GPP, as defining a reference point between PCEF and a standalone TDF has not been agreed. However, most of the DPI boxes available rely on RADIUS signalling for user session creation.

In the last steps indicated in FIG. 6 the TDF selects the mode of operation based on the IMEI.

This operation is basically the same as described with respect to FIG. 5, only that instead of BCM, the Bearer Support Information is derived from the IMEI. In detail, once the standalone TDF node knows if dedicated bearers are supported or not, the same two modes of operation as described above apply.

In case dedicated bearers are not supported, the service sessions should have an aggressive time out period, e.g. between 30 seconds and 2 minutes, to avoid free rides from other services. The aggressive time out period could apply directly to all service sessions or could be restricted only to service sessions whose detection may trigger QoS changes.

In case dedicated bearers are supported, the service sessions should have very long time out periods, e.g. on the order of tens of hundreds of minutes, as described above.

Figure 7:
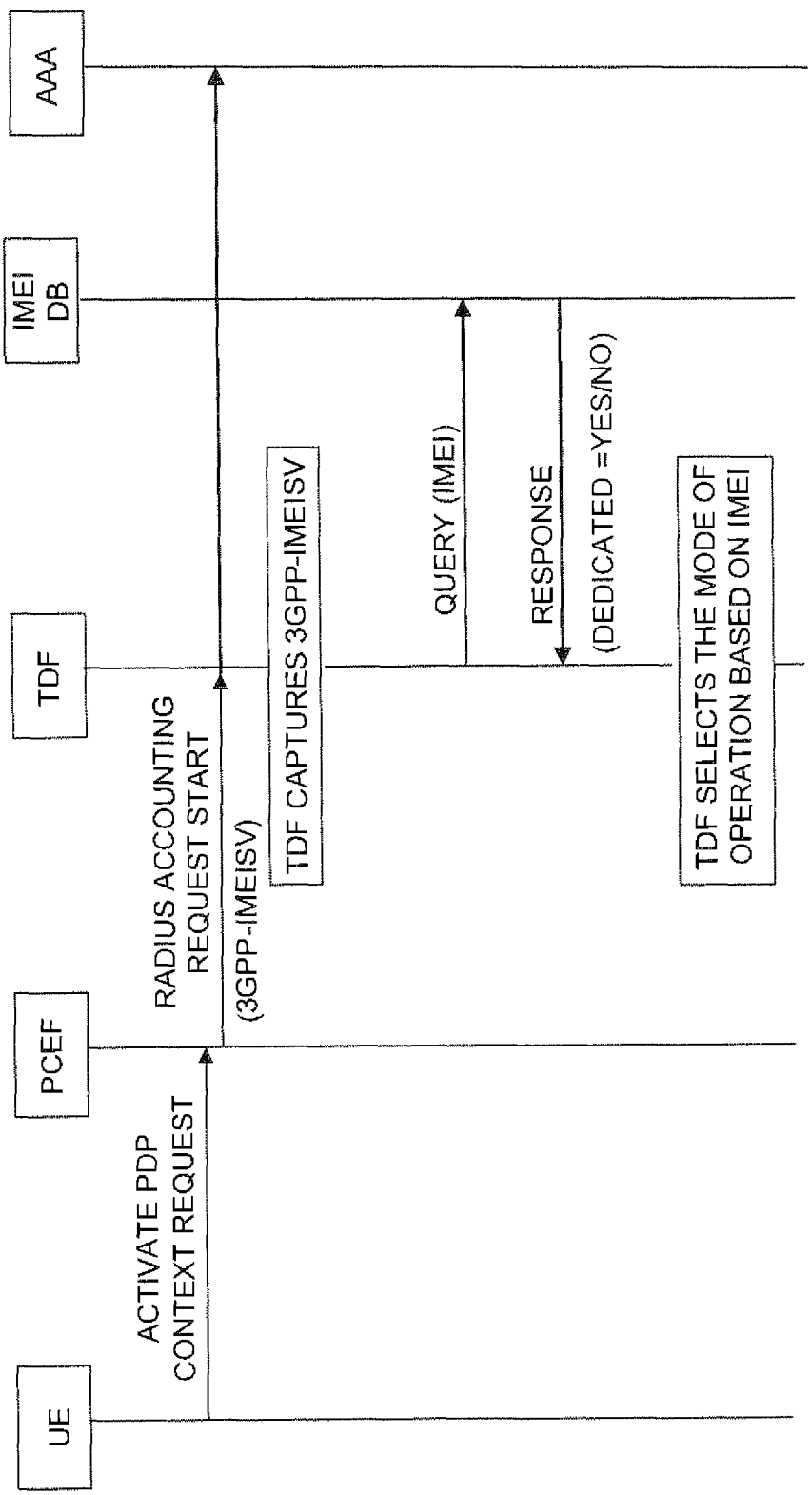
FIG. 7 illustrates another exemplary method according to an embodiment based on IMEI.

As can be seen from a comparison between FIGS. 6 and 7, the flow chart of FIG. 7 comprises basically the same operations as discussed in detail with FIG. 6 only that in the flow chart of FIG. 7 the TDF node directly queries the IMEI database, which simplifies the signalling since the PCRF does not to be involved. The query message in FIG. 7 may comprise the IMEI previously obtained at user sessions establishment from RADIUS signalling at the TDF and the response message may be obtained at the TDF which indicates whether a dedicated bearer is supported or not. Based thereon the mode of operation based on IMEI is selected at the TDF in the same way as described with respect to FIG. 6.

Note that it is also possible that the TDF node in FIGS. 6 and 7 has an internal IMEI database, e.g. TDF configured policies based on IMEI ranges, which would further simplify the signalling.

In the following, the scenario, in which the TDF is collocated with the PCEF is briefly described.

Figure 8B:
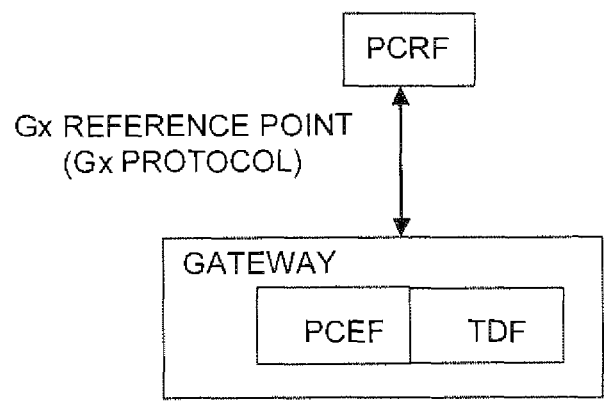
FIG. 8B illustrates a TDF collocated with a PCEF.

This scenario is included to extend the idea to a PCEF node with DPI capabilities, e.g. GGSN. In other words, the traffic detection function is included in the same node as the policy and charging enforcement function. As can be seen in FIG. 8B, there is only one reference point between the PCRF and the node combining the PCEF and TDF, which node may be a gateway. Accordingly, the different deployment scenarios of FIGS. 8A and 8B differ in the type and the amount of interfaces and thus the type and number of messages which have to be used for signalling.

In the case of the TDF being collocated with the PCEF, the solution is simpler as compared to the signalling shown in FIGS. 5 to 7, as the PCEF node already knows if the UE supports dedicated bearers or not by means of both Network-Request-Support AVP and Bearer-Control-Mode AVP. Further, the same modes of operation, as explained above, also apply to the scenario in which the TDF is collocated with the PCEF.

Figure 4:
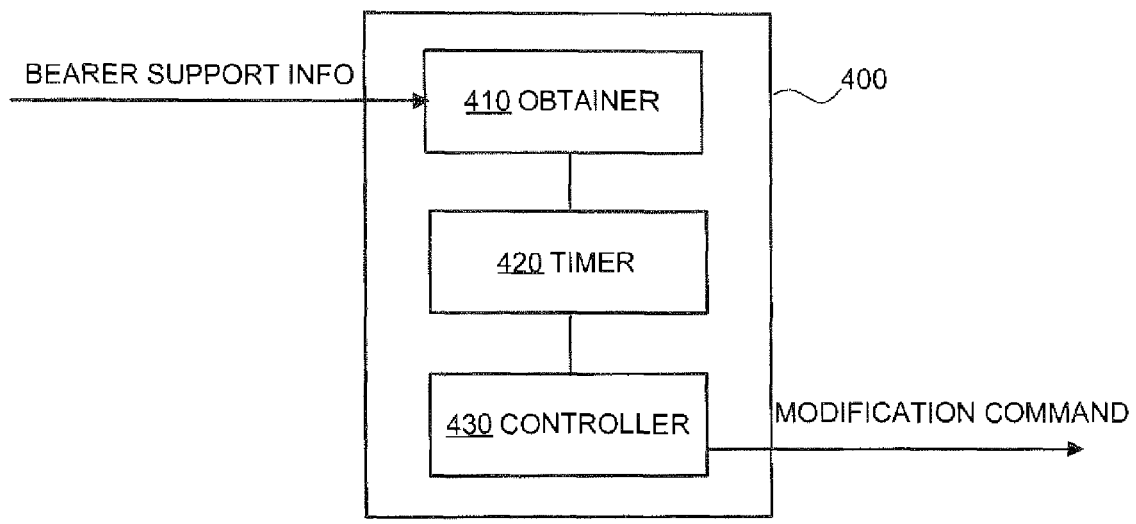
FIG. 4 illustrates elements of a node configured for controlling bearer related resources according to an embodiment.

An example of a node, which may be a node including a TDF or a node including both a TDF and a PCEF, is described with respect to FIG. 4.

The node 400 of FIG. 4 comprises at least three elements, namely the obtainer 410, the timer 420 and the controller 430. The obtainer 410 receives bearer support information indicating whether a user equipment supports a dedicated bearer of a plurality of bearers, which is a bearer dedicated to a service session. Further, the obtainer 410 may be configured to obtain the different kinds of bearer support information described in detail above so that the above-described specific functions and explanations are not repeated again but it is clear to the skilled person that these also apply to the node of FIG. 4.

Further, the timer 420 is configured to set a time period for the service session according to the obtained bearer support information. Different time periods and how they relate to the bearer support information have been described in detail above and it is referred to these sections.

The controller 430 is configured to instruct a modification of a reserved bearer resource assigned to the service session when a time period expires, and thus may instruct a BBF or similar to modify a bearer. Details of the modification have also been described above, and it is noted that the controller may be any kind of programmable processor, and particularly a processor of the node including the TDF which is able to perform packet inspection and service classification. The instruction may be sent by a modification command, as illustrated in FIG. 4. In one embodiment, the modification command may be sent to the PCRF, which instructs the PCEF or other BBF to modify the bearer accordingly.

The node 400 of FIG. 4 may be included in the system further comprising a node including a PCRF configured to determine whether a dedicated bearer is supported based on an identifier of the UE or network bearer support information and UE bearer support information and to include the result of the determination in the bearer support information.

According to the above, free rides of non-sponsored services do not get higher QoS when a sponsored service is not running anymore either because a default bearer carrying all services is quickly downgraded to a lower QoS or lower guaranteed bit rate, or a dedicated bearer is used for a sponsored service and a default bearer does not experience an upgrade in the first place. Similarly, in the opposite scenario, services, which need to be QoS downgraded, can be quickly downgraded if they are carried on the same bearer as a sponsored service after the sponsored service has stopped, or can be downgraded if they are run on a separate bearer parallel to other services that should not be downgraded.

Furthermore, a dynamic service session time out results in a smaller memory footprint in the TDF node, which may be important in communication networks with high traffic.

The physical entities according to the different embodiments of the invention, including the elements, nodes and systems may comprise or store computer programs including instructions such that, when the computer programs are executed on the physical entities, steps and operations according to the embodiments of the invention are carried out, i.e. cause data processing means to carry out the operations. In particular, embodiments of the invention also relate to computer programs for carrying out the operations/steps according to the embodiments of the invention, and to any computer-readable medium storing the computer programs for carrying out the above-mentioned methods.

Where the terms obtainer, timer and controller are used, no restriction is made regarding how distributed these elements may be and regarding how gathered these elements may be. That is, the constituent elements of the nodes and systems may be distributed in different software and hardware components or other devices for bringing about the intended function. A plurality of distinct elements may also be gathered for providing the intended functionalities. For example, the elements/functions of the node may be realized by a microprocessor and a memory, wherein the microprocessor may be programmed such that the above-mentioned operation, which may be stored as instructions in the memory, are carried out.

Further, the elements of the nodes or systems may be implemented in hardware, software, Field Programmable Gate Arrays (FPGAs), Application Specific Integrated Circuits (ASICs), firmware or the like.

It will be apparent to those skilled in the art that various modifications and variations can be made in the entities and methods of this invention as well as in the construction of this invention without departing from the scope of spirit of the invention.

The invention has been described in relation to particular embodiments and examples which are intended in all aspects to be illustrative rather than restrictive. Those skilled in the art will appreciate that many different combinations of hardware, software and/or firmware will be suitable for practising the present invention.

Moreover, other implementations of the invention will be apparent to those skilled in the art from consideration of the specification and practice of the invention disclosed herein. It is intended that the specification and the examples be considered as exemplary only, wherein abbreviations used in the above examples are listed below. To this end, it is to be understood that inventive aspects lie in less than all features of a single foregoing disclosed implementation or configuration. Thus, the true scope and spirit of the invention is indicated by the following claims.

ABBREVIATIONS

3GPP Third Generation Partnership Project
AVP Attribute Value Pair
BCM Bearer Control Mode
CCA Credit Control Answer
CCR Credit Control Request CDN Content Delivery Network
DPI Deep Packet Inspection
GGSN GPRS Gateway Support Node
HTTP Hyper Text Transfer Protocol
IMEI International Mobile Equipment Identity
IMEISV International Mobile Equipment Identity Software Version
IMS IP Multimedia Subsystem
IP Internet Protocol
IP-CAN Internet Protocol Connectivity Access Network
PCC Policy and Charging Control
PCEF Policy and Charging Enforcement Function
PCRF Policy and Charging Rules Function
P-CSCF Proxy Call Session Control Function
PDN GW Packet Data Network Gateway
PDP Packet Data Protocol
QoS Quality of Service
RAA Re-Authorization Answer
RAR Re-Authorization Request
SAPC Service Aware Policy Controller
SASN Service Aware Support Node
TCP Transmission Control Protocol
TDF Traffic Detection Function

The invention claimed is:

1. A method implemented by a policy and charging system in a communication network for controlling bearer related resources in the communication network, wherein the method comprises:
obtaining bearer support information indicating whether a user equipment (UE) supports a dedicated bearer, wherein the dedicated bearer comprises one of a plurality of bearers supportable by the UE and is dedicated to a service session;
setting a time period for the service session according to the obtained bearer support information so that when the UE does not support a dedicated bearer, the set time period is shorter than when the UE supports a dedicated bearer; and
instructing modification of a reserved bearer resource assigned to the service session when the set time period expires.

2. The method of claim 1, wherein the time period is set to a short time period when the bearer support information indicates that the UE does not support a dedicated bearer for the service session, and is set to a long time period when the bearer support information indicates that the UE supports a dedicated bearer for the service session.

3. The method of claim 1, wherein the policy and charging system includes first and second network nodes in the communication network, wherein the first network node includes a policy and charging rules function (PCRF), wherein the method further comprises determining, at the first network node, whether a dedicated bearer is supported based on network bearer support information and UE bearer support information and including the result of the determination in the bearer support information, and wherein said obtaining comprises obtaining the bearer support information at the second network node from the first network node.

4. The method of claim 3, wherein the second network node receives the bearer support information from the first network node in a bearer control mode message.

5. The method of claim 3, wherein said determining is performed by the first network node at session establishment.

6. The method of claim 1, wherein the policy and charging system includes first and second network nodes in the communication network, wherein the method further comprises, at the first network node, obtaining an identifier of the UE, determining, based on the identifier of the UE, whether a dedicated bearer is supported at the UE, and including the result of the determination in the bearer support information, and wherein said obtaining comprises obtaining the bearer support information at the second network node from the first network node.

7. The method of claim 6, wherein said obtaining comprises either:
receiving a bearer support message from a first network node that includes a policy and charging rules function (PCRF), the bearer support message including said bearer support information; or
receiving the bearer support information from a first network node that comprises a database storing a plurality of identifiers.

8. The method of claim 6, wherein said determining is performed by the first network node at session establishment.

9. The method of claim 1, wherein the bearer support information is obtained at a network node that includes a traffic detection function configured to perform packet inspection and service classification.

10. The method of claim 1, wherein the bearer support information is obtained at a network node that comprises either a standalone node or a node collocated with another node that includes a policy and charging enforcement function (PCEF).

11. The method of claim 1, wherein the reserved bearer resource is a Quality of Service, QoS, of a bearer.

12. The method of claim 1, wherein the modification of a bearer resource comprises at least one of downgrading Quality of Service of a bearer, disconnecting the bearer, providing a lower guaranteed bit-rate, or switching to best effort bit rate.

13. A node for controlling bearer related resources in a communication network, comprising
an obtainer circuit configured to obtain bearer support information indicating whether a user equipment (UE) supports a dedicated bearer , wherein the dedicated bearer comprises one of a plurality of bearers supportable by the UE and is a bearer dedicated to a service session;
a timer circuit configured to set a time period for the service session according to the obtained bearer support information so that when the UE does not support a dedicated bearer, the set time period is shorter than when the UE supports a dedicated bearer; and
a controller circuit configured to instruct modification of a reserved bearer resource assigned to the service session when the time period expires.

14. The node of claim 13, wherein the node includes a traffic detection function to perform packet inspection and service classification.

15. A system comprising:
a first node including a policy and charging rules function, PCRF, and configured to determine whether a user equipment (UE) supports a dedicated bearer based on either an identifier of the UE or network bearer support information and UE bearer support information, and to include the result of the determination in bearer support information, wherein the dedicated bearer comprises one of a plurality of bearers supportable by the UE and is a bearer dedicated to a service session; and
a second node comprising:
an obtainer circuit configured to obtain the bearer support information from the first node,
a timer circuit configured to set a time period for the service session according to the obtained bearer support information so that when the UE does not support a dedicated bearer, the set time period is shorter than when the UE supports a dedicated bearer; and a controller circuit configured to instruct modification of a reserved bearer resource assigned to the service session when the time period expires.

16. A computer program product stored on a non-transitory computer readable medium and comprising computer readable instructions that, when executed on a data processor, cause the data processor to control bearer related resources in a communication network, the instructions causing the data processor to:

obtain bearer support information indicating whether a user equipment (UE) supports a dedicated bearer, wherein the dedicated bearer comprises one of a plurality of bearers supportable by the UE and is dedicated to a service session;

set a time period for the service session according to the obtained bearer support information so that when the UE does not support a dedicated bearer, the set time period is shorter than when the UE supports a dedicated bearer; and instruct modification of a reserved bearer resource assigned to the service session when the set time period expires.

17. A method implemented by a network node in a communication network for controlling bearer related resources in the communication network, wherein the method comprises:

obtaining bearer support information indicating whether a user equipment (UE) supports a dedicated bearer, wherein the dedicated bearer comprises one of a plurality of bearers supportable by the UE and is dedicated to a service session; and setting a time period for the service session according to the obtained bearer support information so that when the UE does not support a dedicated bearer, the set time period is shorter than when depends on whether the UE supports a dedicated bearer.

* * * * *

UNITED STATES PATENT AND TRADEMARK OFFICE
CERTIFICATE OF CORRECTION

PATENT NO. : 9,137,843 B2
APPLICATION NO. : 13/146405
DATED : September 15, 2015
INVENTOR(S) : Munoz de la Torre Alonso et al.

Page 1 of 1

It is certified that error appears in the above-identified patent and that said Letters Patent is hereby corrected as shown below:

In the Specification

In Column 4, Line 2, delete "I-ITTP" and insert -- HTTP --, therefor.

In the Claims

In Column 14, Line 37, in Claim 13, delete "bearer ," and insert -- bearer, --, therefor.

Signed and Sealed this
Fifteenth Day of March, 2016

Michelle K. Lee
*Director of the United States Patent and Trademark Office*